Jan. 26, 1960 D. P. MARQUIS ET AL 2,922,680
BEARING SUPPORT
Filed Dec. 3, 1956
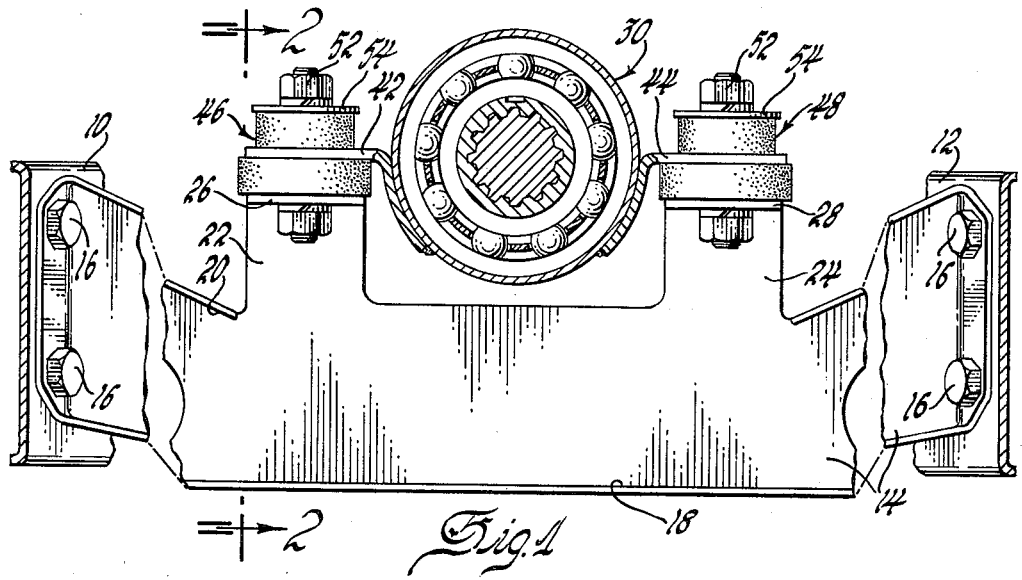
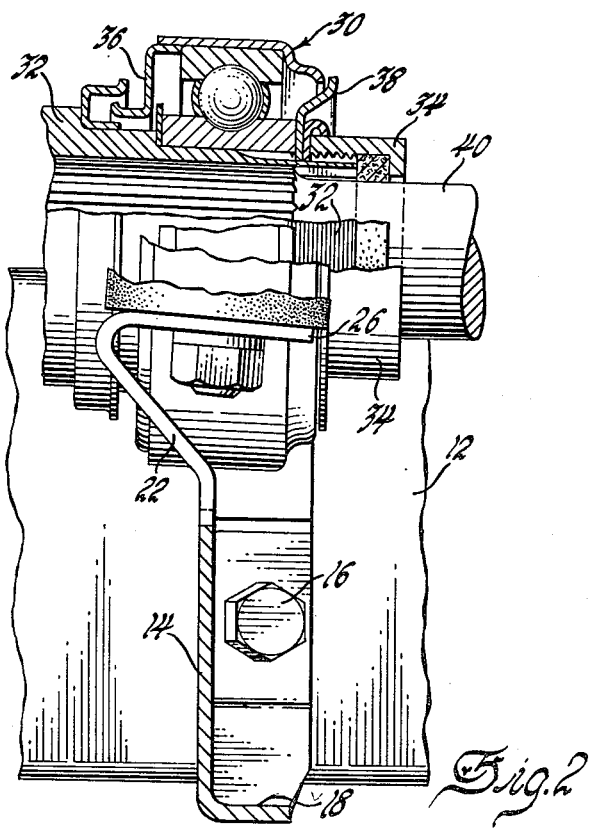
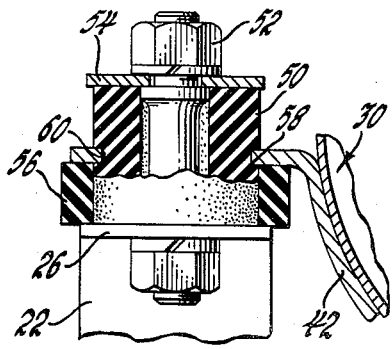
INVENTORS
Donald P. Marquis &
By Raymond J. Schultz
ATTORNEY

United States Patent Office 2,922,680
Patented Jan. 26, 1960

2,922,680

BEARING SUPPORT

Donald P. Marquis, Saginaw, and Raymond J. Schultz, Bay City, Mich., assignors to General Motors Corporation, Detroit, Mich., a corporation of Delaware Application December 3, 1956, Serial No. 625,909

4 Claims. (Cl. 308—28)

This invention relates to shaft supporting means in general and more particularly to means for supporting a drive shaft receiving bearing member.

The present trend to lower the over-all height of automotive vehicles having a rear axle drive has necessitated the use of a jointed vehicle drive shaft. Such a drive shaft requires that the intermediate portion thereof be supported by bearing means which will prevent the shaft from whipping and at the same time will sufficiently damp road noises, extraneous vibrations and the like, from being transmitted from the drive shaft to the vehicle frame or elsewhere. Another consideration is the angularity of the drive shaft to be supported and the relative angular disposition of the center bearing member necessary to avoid excessive bearing wear as a consequence of misalignment.

It is here proposed to provide a drive shaft bearing support wherein the supporting cross member is formed to support the bearing member in spaced relation thereto and includes flexible mounting means such as are best adapted to damp out vibrational disturbances. The proposed bearing support or mount is adjustable in the plane of the support bearing in order to obtain the proper relative position to the supported shaft and thereby eliminate the chance of errors in vehicle frame or support manufacture which might cause possible misalignment of the bearing upon the shaft and consequent bearing wear.

The particular mount here described and claimed is simple to manufacture, assemble and install and has been found exceedingly successful in operation.

In the drawings:

Figure 1 is an end view of the proposed bearing support means.

Figure 2 is a cross-sectioned side view of the proposed support means of Figure 1, taken in the plane of line 2—2 in the direction of the arrows thereon.

Figure 3 is an enlarged and partially cross-sectioned view of one of the bearing supported bushing members.

The converging side rails 10 and 12 of a vehicle frame are shown to include a cross member 14 extending therebetween and having its ends secured to the side rails as by fastening means 16. The cross member is flanged as at 18 and 20 to provide additional strength therefor and has the central portion thereof disposed lower than its ends.

Strap portions 22 and 24 are formed from the central portion of the cross member and extend upwardly thereover. The straps are bent rearwardly of the cross member and back to provide generally horizontally disposed ends 26 and 28 transversely of and disposed over the cross member.

The strap portions being formed from the cross member 14 are in general quite rigid. However, a degree of flexibility may be provided by the width and length of the strap chosen and the mounting location of a member supported upon the ends thereof. The annular disposition of the strap portions is such as permits greater ease in varying the relative height of the ends of the strap above the cross member and consequently, as will be seen, the location of a member supported thereby. The angular disposition of the ends of the strap members may also be readily varied at the time of installation and the minor degree of flexibility permitted the straps also allows certain tolerable alignment errors.

The strap members 22 and 24 are disposed in spaced relation to each other centrally of the support member 14 and receive a bearing member 30 in spaced relation therebetween and over the center portion of said cross member. The bearing member is a conventionally known ball bearing member which is received upon the end of a shaft 32 and held thereto as by lock nut means 34. The usually known shields and protectors 36 and 38 are provided to guard against dirt and other impurities being collected within the ball bearing member. A second drive shaft portion 40 is shown splined within the first-mentioned drive shaft member 32.

Bearing supporting tabs or ears 42 and 44 are secured to the bearing member 30 and have their ends extended radially thereof over and in parallel spaced relation to the ends 26 and 28 of the supporting strap members.

Bushing members 46 and 48 are disposed upon the ends of the strap members for receiving the bearing supporting ears 42 and 44 thereupon. The bushing members include a resilient sleeve 50 disposed upon the upper surface of each of the strap ends 26 and 28 and retained thereto by fastening means 52 and a washer 54. A separate annular resilient ring 56 is concentrically disposed about the resilient sleeve 50 and bottoms against the strap end. An annular groove 58 is provided within the sleeve member just above the ring 56. The radially projected bearing supporting tabs 42 and 44 have an opening 60 formed within their ends for disposing the tabs over the bushing members. The bearing member 30 is thus supported by the ears 42 and 44 upon the annular rings 58, and part of the bushing member 50, in spaced and vibration damping relation to the supporting straps of the cross member 14.

The proposed bearing supporting means readily permits angularly locating the shaft supporting bearing member relative to the shaft it supports despite errors in the manufacture of the vehicle frame or the support member. The height of the strap above the cross member may be varied, bushings and rings of different sizes may be used as shims, the angular disposition of the mount may be varied, and the resilient character of the bushings as well as the straps permits reasonable installation tolerances.

We claim:

1. A drive shaft bearing support comprising a cross member having strap portions formed therefrom and extended thereover, the ends of said strap portions being bent transversely of said cross member, resilient bushings supported upon the ends of said strap members, and a bearing member including support ears received and supported upon said bushings.

2. A drive shaft bearing support comprising a support member adapted to be secured between adjacent frame rails, resilient strap members formed from said cross member and having the ends thereof bent transversely of said cross member, resilient bushings supported upon the ends of said straps, bearing supports disposed upon said bushings and extended towards each other in spaced relation over said cross member, and a shaft bearing secured between said bearing supports.

3. A drive shaft bearing support comprising a transversely disposed support member having upstanding resilient straps formed therefrom, the ends of said straps being bent transversely of said cross member, bushing members mounted upon the ends of said straps, a shaft receiving bearing member disposed between said straps and having supporting ears received upon said bushings and spaced apart from said straps thereby.

4. A drive shaft bearing support comprising a support member adapted to be secured between adjacently disposed side rails of a vehicle frame, said support member having the center portion thereof disposed lower than its ends, strap members formed from said cross member and extended thereover, said strap members being spaced apart and having the ends thereof formed transversely of said cross member, a shaft receiving bearing member disposed in spaced relation centrally over said cross member and between said straps, bearing supporting ears secured to said bearing member and received in parallel spaced relation over the ends of said straps, and resilient bushing members disposed between said strap ends and said bearing supporting ears.

References Cited in the file of this patent

UNITED STATES PATENTS

| | | |
|---|---|---|
| 1,915,058 | French | June 20, 1933 |
| 2,020,597 | Appel | Nov. 12, 1935 |
| 2,674,330 | Feil | Apr. 6, 1954 |
| 2,711,871 | Eck | June 28, 1955 |
| 2,776,174 | McMillan et al. | Jan. 1, 1957 |
| 2,834,641 | Muller et al. | May 13, 1958 |

FOREIGN PATENTS

| | | |
|---|---|---|
| 990,799 | France | May 10, 1949 |